United States Patent Office 2,731,432
Patented Jan. 17, 1956

2,731,432

COATING COMPOSITIONS COMPRISING PARTICULATE POLYAMIDES DISPERSED IN AQUEOUS SOLUTIONS OF ALKALI METAL SILICATES

Harry A. Toulmin, Jr., Dayton, Ohio, assignor to Midland Chemical Corporation, Wilmington, Del., a corporation of Delaware No Drawing. Application March 11, 1953,
Serial No. 341,824

18 Claims. (Cl. 260—29.2)

This invention relates to new coating compositions for use as anti-corrosive protective coatings on metal and other surfaces. More particularly, the invention relates to new and novel coating compositions comprising alkali metal silicates and particulate polyamides.

Protective coatings for metal surfaces must meet several stringent requirements. Such coatings must be continuous and impervious to corrosive influences, sufficiently hard to withstand the abrasive and mechanical shock to which metal objects are normally subjected in use, and must adhere firmly to the surface on which they are deposited for protective purposes.

It has been proposed, previously, to provide coating compositions comprising an aqueous solution of sodium silicate containing zinc dust. It is found, however, that if the readily available, highly alkaline commercial grades of sodium silicate (ratio of sodium oxide to silica, 1:2) are used as the sole silicate constituent of the vehicle for the zinc dust, the highly alkaline material tends to attack the zinc, with evolution of hydrogen, soon after the two are mixed, and that the compositions also give a considerable efflorescence of sodium carbonate when exposed to the air. On the other hand, if sodium silicate of higher sodium oxide to silica ratio, for example 1:3, is used as the sole silicate constituent of the vehicle, there is less tendency for the silicate to attack the zinc, but thick coatings of the composition tend to crack fairly readily.

One object of this invention is to provide a coating composition comprising an alkali metal silicate and having anti-corrosion properties equal to or approximating the anti-corrosion properties of such compositions containing zinc dust but which does not contain zinc.

Another object of the invention is to provide a coating composition comprising an alkali metal silicate which can be applied easily to metal or other surfaces and which will adhere strongly to the surface to protect it from corrosion.

Another object is to provide a coating composition comprising an alkali metal silicate which, when applied to a metal surface, protects the latter with a continuous, hard, strongly adherent, anti-corrosive coating which is flexible and does not tend to crack when the coated surface is subjected to a bending force even when the coating is comparatively thick.

These and other objects and advantages of the invention will appear more clearly from the following description, setting forth the invention in detail.

The objects stated, and others, are accomplished in accordance with this invention by incorporating a high-molecular-weight, resinous polyamide in particulate or dust form in an aqueous solution of an alkali metal silicate, applying the resulting composition to the surface to be protected, and drying the coating. The coating thus obtained is hard, anti-corrosive, strongly adherent, heat- and abrasion-resistant, alkali-resistant and insoluble in water.

The polyamides which are used in the particle or dust form may be polymeric condensates obtained by the co-condensation of dibasic acids and diamines, by known methods, i. e., by heating the selected dibasic acid and diamine and are characterized in having the amide groups as integral members of the polymer chain.

The heating may be performed in two stages. Thus, the diamine and dibasic acid may be heated to produce a relatively low molecular weight polyamide which is then subjected to further heating until a product of high molecular weight, or a so-called super-polyamide, is obtained, this last-mentioned or supplementary heating step being performed under conditions such that volatile by-products are removed from the mass as they are formed. The heating to the superpolyamide stage may be carried out in a molecular still, or the volatile by-products may be removed by the passage of an inert gas or an organic vapor through or over the molten polymer with or without the use of reduced pressure to carry away the volatile products. Other expedients for removing the volatiles may be employed.

The polyamides used in particulate or dust form in practicing this invention are long-chain condensation polymers having a molecular weight of at least 5,000, preferably at least 10,000. The molecular weight may range from 5,000 to the molecular weight at which the polyamides are cold-drawable and exhibit fiber-forming properties. Preferred polyamides are the commercially available products known as nylon and "Perlon."

The acids which may be condensed with the diamines to obtain the polyamides include carbonic, oxalic, succinic, glutaric, adipic, pimelic, sebacic, hexadecamethylene dicarboxylic phthalic, etc. The diamines which may be used include ethylene diamine, trimethylene diamine, propylene diamine, pentamethylene diamine, benzidine, phenylene diamine, etc.

By dibasic acids and diamines as the terms are used herein are meant not only the dibasic acids and diamines themselves but also derivatives thereof, inasmuch as the polyamides may be prepared directly from the acids plus the diamines or from some suitable derivatives of the acids and the diamines.

The polyamides may also be derived by autocondensation of amino acids such as 5-amino-caproic acid, $NH_2(CH_2)_5COOH$, etc., or from N-carboanhydrides of alpha-amino acids. The naming of the amino acids mentioned herein is in accordance with the system of numbering given in Organic Chemistry by Holleman, 7th edition, 1930. By amino acids, there is meant not only the amino acids themselves but also derivatives thereof.

The polyamides may also be obtained by condensation of cyclic amides, preferably those containing more than six annular atoms, and notably from epsilon-caprolactam. The polyamides may be obtained from these cyclic amides by heating the amide in the presence of water and preferably to temperatures between about 180° and 300° C., under superatmospheric pressure, which is usually from 200–280 pounds per square inch, to effect a partial polymerization, and then converting the low polymer thus obtained to a polymer of high molecular weight by distilling off the water gradually from the reaction mixture with eventual reduction of the pressure to atmospheric pressure and then heating the mass at atmospheric pressure and a temperature in the range of 180°–300° C. until the condensation polymer of desired molecular weight is obtained.

The particulate polyamide or polyamide dust used in the invention may be obtained by converting the high molecular weight polyamide to a molten state by heating it to a temperature below the decomposition temperature for the polyamide, solidifying the molten mass by cooling it with solid carbon dioxide, and then grinding the solidified mass to obtain particles having an average size such that at least 90% of the particles pass through a 100 to 400 mesh Tyler sieve.

The alkali silicate solution may be made up of sodium silicate, potassium silicate, lithium silicate, or a mixture of such silicates, in the form of an aqueous solution having, for example, a specific gravity of about 1.26–1.3 (i. e., about 25%–30% by weight of alkali silicate). Effective coating compositions may be made up with alkali silicate solutions of both higher and lower specific gravity, and satisfactory results may be obtained in practice with solutions containing from about 20% to about 40% by weight of the alkali silicate. The sodium silicate, for example, may be any of the commonly marketed ratios of $NaO_2$ to $SiO_2$, which generally range from 1:1.7 to 1:3.9. In general, coatings having satisfactory drying characteristics are obtained when the compositions of this invention contain a sodium silicate having a $NaO_2$ to $SiO_2$ ratio between about 1:2.4 and 1:2.6.

Mixtures of the alkali metal silicates and mixtures of the particulate polyamides may be used in the new compositions. The compositions of the invention are obtained by mixing the polyamide particles of 100 to 400 mesh with the alkali silicate solution. The amount of particulate polyamides used in the coating composition may range from about 5 lbs. to 18 lbs. of the polyamide per gallon of alkali silicate solution.

In forming a hard, protective, anti-corrosive coating on a metal surface using the compositions of this invention, the metal surface, such as iron or steel, is preferably first cleaned to remove scale, rust, dirt and the like, for instance in a pickling bath such as a solution of phosphoric acid or sulfuric acid, followed by rinsing, or by sand blasting, buffing or other mechanical means. The surface of the metal is then coated with the composition comprising the particulate polyamide incorporated in the aqueous alkali metal silicate solution. The composition may be applied to the surface by any appropriate method such as brushing, dipping, spraying or the like. The dipping procedure usually produces a relatively heavy coating which varies in thickness with the viscosity of the coating composition, while brushing and spraying methods, being more easily controlled, are useful in providing a coating of any desired thickness ranging from very thin to heavy anti-corrosive coatings of excellent physical characteristics.

The composition applied to the metal surface is then dried under conditions such as to substantially dehydrate it. This may be accomplished by allowing the coating to dry in the air under normal temperature and humidity conditions, by force-drying, or by a combination of air-drying and forced-drying. If forced-drying is employed, it is performed at temperatures below the temperature at which the particular polyamide is decomposed by heat, but since the polyamides, and particularly the preferred superpolyamides have high decomposition and melting points, relatively high drying temperatures may be used without detriment to the polyamide. Usually temperatures between 200° and 350° F. are satisfactory. The drying may be carried out with the aid of infra-red light, which requires a comparatively short heating time, only.

The compositions of the invention may be modified in certain respects to obtain special results or effects. For example, fatty acids may be incorporated in the compositions for enhancement of their spraying and adhesion characteristics. Also, pigments and/or fillers may be included in the compositions to provide increased body or to modify the appearance, with respect to color or otherwise, of the anti-corrosive protective coating.

The following specific examples will serve to illustrate the practice of the invention:

*Example I*

Nylon dust (obtained by bringing commercial nylon to the molten state, solidifying the molten mass with the use of Dry Ice, and grinding the solidified mass to obtain particles 90% of which passed through a 400-mesh Tyler sieve) is dispersed in a 30% aqueous solution of sodium silicate having a $NaO_2$ to $SiO_2$ ratio of 1:2.6 by slowly adding the nylon dust to the solution with constant agitation until a smooth suspension containing eight pounds of the nylon dust per gallon of silicate solution is obtained.

*Example II*

"Perlon" dust (obtained by bringing commercial "Perlon"—a high molecular weight polyamide from epsilon-caprolactam—to the molten state, solidifying the molten material with the aid of Dry Ice, and grinding the solid mass to obtain particles at least 90% of which pass through a 400-mesh Tyler sieve) is dispersed in a 35% aqueous solution of a sodium silicate having a $NaO_2$ to $SiO_2$ ratio of 1:2.3 to 1:3 by adding the dust slowly to the solution with constant agitation until a smooth suspension containing about 12 lbs. of the dust per gallon of the sodium silicate solution is obtained.

*Example III*

A polyamide dust (prepared by bringing a polyamide obtained by self-condensation under heating of the amino acid 6-aminocaproic acid and having a unit length of 7 and a melting point of 205°–210° C. to molten condition, solidifying the molten mass with the aid of Dry Ice and grinding the solid mass to obtain particles at least 90% of which pass through a 400-mesh Tyler sieve) is added slowly to a 30% aqueous solution of a sodium silicate having a $NaO_2$ to $SiO_2$ ratio of about 1:2.4, with constant stirring, until a smooth suspension containing 10 lbs. of the particulate polyamide per gallon of alkali silicate solution is obtained.

The above mixtures or compositions are applied on articles to be coated and allowed to air-dry or to air-dry for about ten minutes and then baked at elevated temperatures of 200° to 300° F.

The coatings obtained by the application of the composition of the invention are extremely durable, are not affected by rain, salt water, oxygen or the like, and are continuous films of excellent protective qualities.

It will be understood that, while there have been given herein certain specific examples of the practice of this invention, it is not intended thereby to have the invention limited to the specific details with respect to the respective materials, preparations or conditions exemplified, since the invention may be modified to adapt it to particular conditions and use. Therefore, the invention is not to be limited except as defined in the appended claims.

I claim:

1. A liquid coating composition comprising a dispersion of a particulate polyamide having the amide groups thereof as integral members of the polymer chain, a molecular weight of at least 5,000 and an average particle size such that at least 90% of the particles are capable of passing through a 100 to 400-mesh Tyler sieve, in an aqueous solution of from about 20% to about 40% by weight of an alkali metal silicate having an $XO_2$ to $SiO_2$ ratio between about 1:1.7 to 1:3.9, X representing the alkali metal, the amount of particulate polyamide in the composition being between about 5 lbs. and 18 lbs. thereof per gallon of the aqueous alkali metal silicate solution.

2. A liquid coating composition as in claim 1 in which the polyamide is the condensation product of a dicarboxylic acid and a diamine.

3. A liquid coating composition as in claim 1 in which the particulate polyamide is polymerized epsilon aminocaproic acid.

4. A liquid coating composition as in claim 1 in which the particulate polyamide is a polymerized cyclic amide having at least six annular atoms.

5. A liquid coating composition as in claim 1 in which the particulate polyamide is polymerized epsilon-caprolactam.

6. A liquid coating composition as in claim 1 in which the alkali metal silicate is sodium silicate having an NaO$_2$ to SiO$_2$ ratio of from 1:2.4 to 1:2.6.

7. A liquid coating composition as in claim 1 in which the alkali metal silicate solution is a 25% to 40% solution of sodium silicate having an NaO$_2$ to SiO$_2$ ratio of from 1:1.7 to 1:3.9.

8. The method of providing metal and other surfaces with a strongly adherent, corrosion-resistant, protective coating which comprises applying to the surface a composition comprising a particulate polyamide having the amide groups thereof as integral members of the polymer chain, a molecular weight of at least 5,000 and an average particle size such that at least 90% of the particles are capable of passing through a 100 to 400 mesh Tyler sieve dispersed in an aqueous solution of from about 20% to about 40% by weight of an alkali metal silicate having an XO$_2$ to SiO$_2$ ratio between about 1:1.7 to 1:3.9, X representing the alkali metal, the composition containing from about 5 to 18 lbs. of the polyamide per gallon of the alkali metal silicate solution, and drying the coating on the surface.

9. The method of claim 10 in which the coating is dried in the air under normal temperature and humidity conditions.

10. The method of providing metal and other surfaces with a strongly adherent, corrosion-resistant, protective coating which comprises applying to the surface a composition comprising a dispersion of a particulate polyamide having the amide group thereof as integral members of the polymer chain, a molecular weight of at least 5,000 and an average particle size such that at least 90% of the particles are capable of passing a 100 to 400-mesh Tyler sieve in an aqueous solution of from about 20% to about 40% by weight of an alkali metal silicate having XO$_2$ to SiO$_2$ ratio between about 1:1.7 and 1:3.9, X representing the alkali metal, and drying the coating on the surface, the proportion of polyamide to alkali silicate solution being between 5 and 18 lbs. of the polyamide per gallon of the solution.

11. A method according to claim 10 characterized in that the particulate polyamide is the condensation product of a dicarboxylic acid and a diamine in dust form.

12. A method according to claim 10 characterized in that the polyamide is polymerized epsilon aminocaproic acid.

13. A method according to claim 10 characterized in that the polyamide is a polymerized cyclic amide containing at least six annular atoms.

14. A method according to claim 10 characterized in that the polyamide is polymerized epsilon-caprolactam.

15. A method according to claim 10 characterized in that the polyamide is dispersed in a 25% to 40% aqueous solution of sodium silicate having an NaO$_2$ to SiO$_2$ ratio of from 1:1.7 to 1:3.9.

16. As a new article of manufacture, a surface having a hard, firmly adherent, anti-corrosive coating thereon comprising an alkali metal silicate having an XO$_2$ to SiO$_2$ ratio between 1:1.7 and 1:3.9, X representing the alkali metal and a particulate polyamide having the amide groups thereof as integral members of the polymer chain, a molecular weight of at least 5,000 and an average particle size such that at least 90% of the particles are capable of passing through a 100 to 400 mesh Tyler sieve.

17. As a new article of manufacture, a surface having a hard, firmly adherent, anti-corrosive coating comprising a sodium silicate having an NaO$_2$ to SiO$_2$ ratio of from 1:1.7 to 1:3.9 and a polyamide which is the condensation product of a dicarboxylic acid and a diamine in dust form.

18. As a new article of manufacture, a surface having a hard, firmly adherent, anti-corrosive coating thereon comprising a sodium silicate having a NaO$_2$ to SiO$_2$ ratio of form 1:1.7 to 1:3.9 and a high molecular weight polymerized epsilon-caprolactam, in dust form.

References Cited in the file of this patent

UNITED STATES PATENTS 2,467,192    Cupery  --------------- Apr. 12, 1949